United States Patent Office 3,795,664
Patented Mar. 5, 1974

3,795,664
PROCESS FOR PREPARING PEPTIDES OR PROTEINS
Geoffrey William Tregear, Heidelberg, and Kevin John Catt, Middlepark, Victoria, Australia, and Hugh David Niall, Los Altos, Calif., assignors to Imperial Chemical Industries of Australia and New Zealand Limited, Melbourne, Victoria, Australia
No Drawing. Continuation of abandoned application Ser. No. 761,863, Sept. 23, 1968. This application Oct. 12, 1971, Ser. No. 188,487
Claims priority, application Australia, Sept. 21, 1967, 27,545/67
Int. Cl. C07c 103/52; C07g 7/00
U.S. Cl. 260—112.5                                   11 Claims

ABSTRACT OF THE DISCLOSURE

A process for preparing peptides or proteins by (1) reacting a protected amino acid with a graft copolymer having a chemically inert polymeric backbone and grafted-on side chains of the formula:

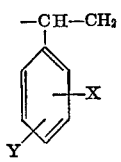

wherein X is at least one amino acid reactive group forming a bond with the first amino acid which is not cleaved during subsequent reaction of the first amino acid with a second amino acid and wherein Y stands for one or more optional substituents which is non-reactive to amino acids, to form a stable linkage between the protected amino acid and the copolymer; (2) deprotecting the resulting amino acid-copolymer complex; (3) coupling another amino acid or peptide to the deprotected group of the complex; (4) optionally repeating steps (2) and (3) and optionally cleaving the desired peptide from the resulting peptide-copolymer.

---

This is a continuation of application Ser. No. 761,863 filed Sept. 23, 1968, now abandoned.

This invention relates to processes for the preparation of peptides and proteins, and in particular to a process whereby a peptide is formed using a polymeric solid.

The classical approach to peptide synthesis has yielded successes in recent years in that small amounts of certain peptides have been prepared by several methods. However, these procedures were not ideally suited to the synthesis of long chain polypeptides because the technical difficulties with solubility, steric (optical) specificity and purification became formidable as the number of amino acid residues increased. In an attempt to overcome some of these difficulties, Merrifield has described in J.A.C.S., 85, 2149 (1963) the synthesis of a tetrapeptide which involved the stepwise addition of protected amino acids to a growing peptide chain which was bound to a solid chloromethylated crosslinked copolymer of styrene and divinyl benzene. Although this was a mjor improvement over the classical procedures, one difficulty with this method was that Merrifield's polymer was prone to swell to form sticky particles. The swelling led to the need for multiple treatments of the polymer between steps and the stickiness caused difficulties with filtration, washing and purification. Thus with gelatinous polymers of this type the unreacted amino acids, which are the expensive building stones to be assembled stereospecifically, become absorbed or adsorbed in the interstices of the polymer; consequently they must be removed in the desorption step and several washes are required each of which still leaves a proportion of the amino acid behind. In the synthesis of peptides involving the linking of as many as several dozens of amino acids and consequently as many sequential bonding reactions, the yield in each reaction, the undesired retention of unreacted residues from earlier reactions leading to by-products, and hence the complete removal of intermediates, the ease and the rate of washing are highly critical.

Even an apparently marginal improvement in yield, "cleanness" of the reaction and ease and rate of washing, has an exponential effect on the overall yield, purity and rate of production over a sequence of, say, 5, 10 or 50 reaction cycles. Thus the overall yield from a sequence of thirty steps is 21.4%, if each is performed with an efficiency of 95%, but 54.4%, if the efficiency is 98%. Accordingly, with higher peptides it is no exaggeration to say that an apparently marginal improvement in yield per step from, say, 95% to 98% may make the difference between a laboratory and a technical preparation, and if at the same time as the yield per step is increased, the time for performing a step is decreased the probability of achieving a technical preparation is increased still further. When Merrifield's process is applied to peptides of a large molecular size, reaction and subsequent removal from the interstices could become progressively more difficult and less efficient. Although peptides containing up to 55 amino acid residues have been made by Merrifield's technique, the cost of the product could be so high that these products are not competitive commercially with products from natural sources. A cheaper process is therefore desirable.

In Australian patent application No. 4,671/66 there are described substituted graft copolymers which contain on their surface at least one reactive group and which may be reacted with amino acids, peptides, proteins or nucleotides. These copolymers are solids and may be fabricated in a variety of desired shapes; for example, they may be made into semipermeable membranes, pellets, discs, filters, tubes and rods of desired porosity. We have now found that certain of these surface-modified and internally inert polymers may be used to reduce the difficulties of the prior art in the preparation of peptides or proteins by the stepwise addition of protected amino acids to a growing peptide chain or in the linking of a large peptide chain already so formed to other peptide chains to form a peptide or protein at improved overall yields and efficiencies.

Accordingly we provide a process for the preparation of peptides or proteins which comprises:

(1) Reacting a first protected amino acid which, optionally, may be attached to a peptide or part of a peptide, with a copolymer which is characterized in that it is a graft copolymer of a chemically relatively inert polymeric backbone and grafted-on side chains comprising a multiplicity of mer units of the formula

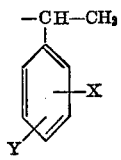

wherein X is at least one amino acid reactive group forming a bond with the first amino acid sufficiently strong not to be cleaved during subsequent reaction of said first amino acid or peptide with a second amino acid or peptide and wherein Y stands for one or more optional substituents which is non-reactive to amino acids, to form a stable linkage as defined between the protected amino acid and the copolymer;

(2) Deprotecting the amino acid or peptide-copolymer-complex formed by removing the protecting group;

(3) Coupling at least one further protected amino acid or peptide with the deprotected reactive group of the first amino acid or peptide-copolymer-complex obtained in (2);

(4) Optionally, alternately repeating one or more times the removal step (2) of the protecting group from the last amino acid attached to the peptide chain-polymer complex and the coupling step (3) with yet a further amino acid or peptide; and (5) Optionally cleaving the desired peptide from the peptide-copolymer by rupture of one selected bond in the chain.

By amino acid reactive group we mean a group capable of forming a chemical link of the specified stability with the amino acid.

The peptides formed by our process may be used in several ways: the whole of the peptide may be cleaved from the copolymer; part the peptide may be separated at a predetermined amide-link from the copolymer-peptide complex or finally, in certain instances, the copolymer-peptide complex may be used as such, without cleavage. The most preferred method is cleavage of the whole peptide from the copolymer. Accordingly the linking groups X may be "cleavable" or "non-cleavable." by "cleavable" we mean a group sufficiently strong not to be cleaved during the coupling reaction with yet a further amino acid or during the amino group deprotecting step yet capable of being cleaved by a subsequent treatment not affecting the amide link between the said amino acids. By "non-cleavable groups" we mean that it is not possible to remove them from the copolymer without damage to the peptide chain or protein to which they are attached.

Accordingly a preferred process according to this invention as defined above is characterized in that X is a cleavable amino-acid-reactive group forming with one reactive group of a first amino acid or peptide a bond sufficiently strong not to be cleaved during the subsequent coupling and deprotecting steps (2) and (3) with further amino acids or peptides yet capable of being cleaved by a subsequent treatment not affecting the amide link between any one of the amino acids or peptides in the chain and characterized further in that, on completion of a sequence of alternate deprotecting and coupling steps (2) and (3) defined above, the whole of the peptide formed is cleaved from the copolymers. Cleavage is facilitated by the presence in the copolymer of non-reactive groups Y, such as alkyl, for example methyl or nitro. The latter group is particularly useful when cleavage is effected by ammonolysis.

In a further process according to this invention the amino acid reactive group X is non-cleavable and forms with the amino acid a bond at least as stable as the amide link between the amino acids; a peptide of desired characteristics and length is built up by a sequence of alternate deprotecting and coupling steps (2) and (3) as described above; and cleavage of a desired fraction of the peptide chain is achieved by enzymes acting specifically on certain peptide linkages. Optionally the residual peptide-copolymer complex may then be re-used as the starting point of a further desired peptide chain.

In yet another embodiment of this invention X is a non-cleavable amino acid reactive group as defined and the copolymer-peptide complex built up as described above is used as such, without cleavage.

The reactive group of the amino acid may be either the amino or the carboxy group or, when present, even sulphydryl, sulphur, hydroxy or phenyl groups. Preferred are the amino and carboxy groups; most preferred is the amino group. The various complementary amino acid reactive groups X in the copolymer e.g. $X_1$ to $X_R$ are, of course, chosen accordingly. Complementary pairs of reactive groups of the amino acid and the preferred cleavable group X are e.g.

(1) The trihydrocarbyl, usually trialkyl ammonium salt of a protected amino acid and $X_1$=—$CH_2Cl$, which groups may be reacted to form a methylene ester linkage in the manner described by Merrifield, J.A.C.S., 85, 2149 (1963);

(2) The amino group of an amino acid ester, protected by its ester group and

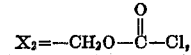

which is prepared from the hydroxymethyl group —$CH_2OH$ and phosgene as described by L. Letsinger et al. [J.A.C.S., 85, 3045 (1963)]; and, less preferred, (3) The carboxyl group of an amino acid, protected by an ester group and $X_3$ is —$CH_2OH$ in the manner described by Bodansky et al. (Chem. & Ind. 1964 p. 1423). Pairs (1) and (2) are preferred, pair (1) is most preferred.

Non-cleavable pairs of reactive groups in the amino acid and amino acid reactive groups X are e.g. the amino group of a protected amino acid and a member of the group $X_4$ to $X_6$, where $X_4$=isothiocyanato, or $X_5$=—COCl, or $X_6$=a diazonium salt

and where Z is the residue of a strong acid e.g. Cl⁻. A non-cleavable pair utilizing the carboxy group of the amino acid comprises the latter and $X_7$ where $X_7$ is —LNHR″ used together with a carbodiimide coupling agent of the formula RN=C=NR′ and wherein L is a linking group preserving the basicity of the amino group by separating it from the aromatic ring of the styrene molecule and R and R′, which may be the same or different, are not narrowly critical and may be cycloalkyl, alkyl or aryl. A further non-cleavable pair is a sulphydryl group in the amino acid and $X_8$ where $X_8$ is a mercuric group introduced into the polystyrene side chains by diazotizing the styrene groups, mercurating them in a known manner and destroying the excess of diazo group. A preferred carbodiimide coupling agent is N,N-dicyclohexylcarbodiimide. R″ may be alkyl, particularly lower alkyl having e.g. one to four carbon atoms. Methods of effecting the peptide linkages with $X_4$, $X_5$, $X_6$ and $X_7$ are known e.g. from McKinney et al. [J. Immunology, 93, 232 (1964)], L. Letsinger et al. [J.A.C.S., 85, 3045 (1963)], and Yagi et al. [J. Immunology, 85, 374 (1960)].

By "protected" we mean the term used in the art to indicate that at least one of the reactive groups of the amino acid, for example the α-amino, the α-carboxy or the non α-reactive groups, is temporarily inactivated by a readily cleavable group so as to control the attachment of the first amino acid to the copolymer and of subsequent amino acids so as to attain the desired stereospecificity. When the first amino acid reacts with X through its carboxyl group, the amino group may be protected by a carbobenzoxy, a o-nitrophenylsulphenyl or a t-butyloxycarbonyl group; t-butyloxycarbonyl is preferred. When the first amino acid reacts through its amino group, e.g. with $X_5$, the carboxy group is protected by a hydrolyzable ester group e.g. a benzyl ester group. The techniques of protecting amino acids in peptide syntheses, the attachment of the protecting groups to the amino acid and their subsequent cleavage from it are known "per se."

Once the first amino acid or peptide is attached to one copolymer its alpha protecting group is removed and the liberated reactive group is coupled further with a further protected amino acid. Here again, protecting groups may be carbobenzoxy, n-nitrophenylsulphenyl-, or most preferred, t-butyloxycarbonyl. All of these protected amino acids can be coupled in suitable known media, e.g. dimethylformamide or methylene dichloride, and once coupled the protecting group may be readily split by, for example, anhydrous hydrogen chloride in the presence of a suitable solvent, e.g. dioxan or acetic acid.

A particularly preferred method of coupling amino acids is Sheehan's carbodiimide method [Sheehan et al., J.A.C.S., 77, 1067 (1955)]. Where it is undesirable to use the carbodiimide method, for example when amino acids such as glutamine or asparagine are being coupled, use may be made of the p-nitrophenol ester method known from Bodansky et al. (Chem. and Ind., 1964, p. 1423).

The nature of the polymeric inert backbone to which the polystyrene branches are grafted is critical for attainment of the technical advantages provided by this invention. The position of the active groups on the surface, which characterizes the graft copolymers of copending Australian patent application No. 4,671/66, is a marked advance in itself; for the use of these copolymers in syntheses according to the present invention the additional advantage arises that the ease of synthesis is the greater, the more inert the polymeric backbone is to the solvents and to the agents used. By inert we mean chemically inert to, non-solvated by and non-swellable or relatively non-swellable by the reaction medium. Thus preferred polymeric backbones are the polyphenylene oxides, polyimides, poly(paraxylylenes), poly(halofluoroalkylenes), for example poly(tetrafluoroethylene) and poly(trifluoromonochloroethylene), and phenol formaldehydes and polyolefines.

The shape of the backbone polymers may take various forms; for example they may be made into powders, discs, tubes, rods or pellets having regular or irregular shapes. Spherical or substantially spherical shaped particles, discs or pellets are preferred.

In cases where the polymeric backbone has a density not greater than unity it is desirable to increase the density of the backbone by incorporating into the polymer by means known per se an amount of an inorganic inert filler having a density greater than unity. Suitable fillers may include, for example, oxides of titanium, lead, tin, zirconium, silicon; mineral earths and clays.

By the use of the copolymers of Australian patent application No. 4,761/66 specified above we minimize swelling of the interior of the copolymers because of the inert nature of the backbone; we avoid excessive adsorption or absorption of the amino acids into the interstices of the copolymer from which long chain peptides are difficult to remove; we reduce retention of mother liquor and hence achieve greater ease and rate of washings; reduce loss of greater purity than has hitherto been possible; and we obtain an improved rate of desorption of the peptide or protein from the polymer. In addition the use of copolymers according to Australian patent application No. 4,671/66 offers a greater choice of amino acid reactive coupling groups than the polymers used in the prior art because cleavage on the surface requires less drastic treatment. We are also able to regulate the density of amino acid reactive sites on the surface of these copolymers and hence can adjust the statistical site distances to suit the size of the peptide or protein to be prepared. This designed spacial arrangement avoids hindrance of the peptides within the copolymer and/or hindrance between the growing peptide or protein chains on the surface.

Solid articles fabricated from these copolymers in specially designed shapes have the advantage that their shape and size remains substantially unchanged when they are used in a large number of successive steps as media for the preparation of a peptide or a protein and the difficulty of transferring the polymer-bound peptide chain from one reaction vessel to another is reduced substantially compared with the prior art polymers. This facilitates handling and offers a simple alternative to the technique of pumping a sequence of reagents to and from the reactor: the solid shaped copolymer with all desired groups attached to it may be simply transferred from one reaction medium to the other. Furthermore, since the porosity of the shaped polymer can be controlled, difficulties with solvent flow, filtration and purification are reduced substantially.

A preferred embodiment of this invention comprises:

(1) Reacting solid phase poly(trifluoromonoethylene-g-chloromethylstyrene) with the trialkylammonium salt of a first amino acid or peptide, the amino group of which is protected by an acid sensitive amino-protecting agent, preferably a t-butyloxycarbonyl group to form the methylester of said acid;

(2) Cleaving said protecting agent from the copolymer-amino acid ester complex preferably by reating it with a hydrogen halide and forming the amine base from the resultant salt;

(3 Coupling to the amino acid ester-copolymer complex resulting from (2) at least one further amino acid or peptide having an acid sensitive amino-protecting group, preferably a t-butyloxycarbonyl group by means of a carbodiimide coupling group $RN=C=NR'$ or, alternatively, coupling to said complex a p-nitrophenyl-, N-hydroxy phthalimide-, N-hydroxysuccinimide- or a pentachlorophenyl ester of a protected amino acid;

(4) Repeating the deprotecting step (2) and the coupling step (3) alternatingly with a number of selected amino acids or peptides; and (5) Cleaving the peptide from the copolymer carrier preferably with anhydrous halogen halide, e.g. HBr in a non-aqueous acid.

A particularly preferred embodiment comprises the use of poly(tetrafluoroethylene-g-chloromethyl styrene) as the graft copolymer in the form of pellets or discs.

Reaction conditions for the use of our copolymers in the individual steps are similar to those known from the prior art for the individual steps. Thus step (1) may be carried out in a suitable solvent, e.g. methanol, under reflux over a prolonged period. The deprotecting step (2) is carried out with an inorganic halo acid, for example hydrochloric acid which has been dissolved in a highly pure, water-free inert organic solvent, for example dioxan or acetic acid, at temperatures from about 0° to 50° C. and preferably from 15° to 25° C. for periods of up to 8 hours, preferably from 30 minutes to 5 hours. The coupling step (3) is carried out in suitable organic solvents, for example methylene chloride, dimethylformamide or tetrahydrofuran. A preferred carbodiimide is N,N'-dicyclohexylcarbodiimide. The coupling reaction is performed at temperatures from 0° to 60° C. and preferably from 0° to 35° C. over periods up to 24 hours, preferably from 4 to 16 hours.

Cleavage of the bond between the linking group X and the carboxy group of the first amino acid of the peptide chain to remove the synthesized peptide from the copolymer, i.e. rupture of the benzyl ester link (step 5), may be achieved by treating the complex with an anhydrous inorganic halo acid for example hydrogen bromide in the presence of a carboxylic acid, e.g. acetic acid or trifluoroacetic acid. Cleavage may also be effected in a manner known from Lenard et al., J.A.C.S., 89, 181 (1967) using mixtures of hydrogen fluoride and anisole. The linkage may also be cleaved by saponification with an alkylonic solution of an alkali metal hydroxide, or by ammonolysis or hydrazinolysis.

In certain instances it may be desirable to separate from a peptide chain or a protein, portion of the chain without cleaving the first amino acid from the copolymer. It is known that certain enzymes attack peptide chains and proteins at specific points of the chain. By suitable selection of the amino acids chosen to synthesize the peptide chain or protein by means of our invention and by appropriate choice of enzyme it is possible to obtain a peptide or protein of desired length and characteristics.

Our process is also suitable for the synthesis of other oligomers or polymers of defined sequence and structure based on amino acids or hydroxylic compounds such as polynucleotides and polysaccharides in a manner similar to that used for the preparation of proteins and peptides. The potential of the invention resides in the fact that it is particularly suited for highly efficient rapid sequences of cycles of the operations on a relatively large scale. By contrast in Merrifield's process the solid phase forms a swollen sticky gel during the washing and reaction cycles. This gelatinous material tends to adhere tenaciously to the sides of the reaction vessel and is difficult to remove therefrom by washing or mechanical means. It also occludes impurities and wash liquor and because of its gelatinous nature needs to be separated from wash liquors by means of a fine filter. As is well known, filtration of such materials in this manner is extremely slow and although it is possible to perform such operations on a laboratory scale, they become impractical on a technical scale. By our invention it is possible for example to prepare pellets or porous blocks of the copolymers suitable for use in large reactors so as to prepare peptides or proteins by a commercial process which may be wholly or partially automated. By the use of equipment of suitable design all the chemical reactions and all the intermediate purification steps may be carried out in the same vessel.

Accordingly we also provide a process for the manufacture of peptides and proteins characterized in that the process, as defined above, is performed in a wholly or partially automated manner.

Our invention is now illustrated by but not limited to the following examples.

EXAMPLE 1

The performance of three graft copolymers as claimed in this specification was compared with a prior art polymer (Merrifield's resin) in the synthesis of a (simple) tripeptide glycyl-l-leucylglycine.

The following Table I illustrates the nature of these polymers and their extent of chloromethyl substitution.

The polymeric complexes were subjected to the following cycle of operations:

(1) Washed once with dioxan.
(2) Suspended in 4 M HCl in dry dioxan (10.0 ml.) for 30 minutes (Funnel mouth sealed from atmosphere to prevent absorption of water).
(3) Washed thoroughly with dioxane then with chloroform.
(4) Suspended in 10% triethylamine in chloroform (10.0 ml.) for 10 minutes.
(5) Washed with chloroform then with methylene chloride.
(6) Suspended in methylene chloride containing t-butyloxycarbonyl-1-leucine (439 mgm., 1.76 millimole) and allowed to stand for 10 minutes.
(7) Solution of N,N'-dicyclocarbodiimide (363 mgm.; 1.76 millimole) in methylene chloride (1.5 ml.) added, mixture stirred and allowed to stand overnight at room temperature.
(8) The polymeric complex was washed with methylene chloride followed by washings with dimethylformamide, ethanol and finally dioxan.
(9) Steps 2 to 5 inclusive were repeated once.
(10) The polymeric complex was suspended in methylene chloride containing t-butyloxycarbonyl glycine (308 mgm., 1.76 millimole) and allowed to stand for 10 minutes.
(11) Steps 7 and 8 were repeated once.
(12) The polymeric complex was given a final wash with methanol and dried in vacuo.

Polymeric complex A swelled considerably in the solvents to an intractable sticky mass.

Polymeric complexes C and D remained as free-flowing powders which facilitated washing.

Polymeric complex B in the form of the small discs was exceedingly easy to "handle" and mechanical losses of the polymer were completely avoided.

TABLE I

| Code | Polymer | Percent polystyrene | $-CH_2Cl/$ g. millimole | Amount taken (g.) | $-CH_2Cl$ millimole taken |
|---|---|---|---|---|---|
| A | Merrifield's polymer | 98.0 | 1.50 | 1.47 | 2.205 |
| B | Poly(tetrafluoroethylene-g-chloromethyl styrene) in the form of shaped article (discs) | 2.63 | 0.338 | 6.52 | 2.205 |
| C | Poly(trifluorochloroethylene-g-chloromethyl styrene) in the form of a fine powder | 0.37 | 0.106 | 20.70 | 2.205 |
| D | Poly(trifluorochloroethylene-g-chloromethyl styrene) in the form of a coarse powder | 1.19 | 0.260 | 8.47 | 2.205 |

The various steps in the synthesis were performed in an identical manner with each polymer.

Thus tertiary butyloxycarbonyl-glycine (264 mg., 1.508 millimole) was dissolved in ethanol (1.5 ml.) and triethylamine (0.21 ml., 1.508 millimole) added. The solution was transferred to a 50 ml. round bottom quick-fit flask containing the appropriate polymer suspended in ethanol (5.0 ml.). The amino acid container was washed with ethanol (3 × 1.5 ml.) to give a total ethanol volume in the reaction flask of 11.0 ml. The flask was then fitted with a water condenser and the mixture refluxed for 48 hours. The mixture was then filtered and the polymeric complex washed successively with ethanol, water and methanol, dried in vacuo and weighed. The weight increase of each polymer is indicated in Table II.

TABLE II.—INCREASE IN WEIGHT OF ORIGINAL POLYMER

Polymers: Mgm.
A _____ 87
B _____ 140
C _____ 136
D _____ 88

The dried polymeric complexes were transferred to quick-fit sintered glass filter funnels and allowed to swell in dioxan. The subsequent deprotecting, coupling and washing steps were all carried out in the filter-funnel.

The polymeric complex was transferred to a small reaction vessel and suspended in trifluoroacetic acid (12 ml.). A slow stream of anhydrous HBr was bubbled through the mixture for 50 minutes at room temperature. The mixture was then filtered and washed with trifluoroacetic acid (3× 10 ml.). The acid washings were combined and evaporated to dryness to yield a yellow-brown oil. The oil was redissolved in trifluoroacetic acid (10 ml.) and evaporated to remove traces of HBr. Lyophilization of the sample was attempted by dissolving in dilute acetic acid but in each case there resulted an oily residue. The final yield of product from each polymer is indicated in Table III.

TABLE III

Polymer designation: Weight of product, mgm.
A _____ 50
B _____ 62
C _____ 26
D _____ 54

Paper electrophoresis was performed on each product together with a mixture of the individual amino acids and a sample of authentic gly-l-leu-gly manufactured by Mann Biochemicals. The result of the tests indicated that the tripeptide was present in each of the products four polymers A, B, C and D. Each product also contained small amounts of unreacted leucine. The leucine spot was weakest in the product from polymer C; of equal intensity in the products from polymers A and D and strongest in the product from polymer B. Unreacted glycine was detected in samples A, B and D but was not detectable in polymer C.

EXAMPLE 2

This example demonstrates the effect of solvents on a polymer of the prior art and on a polymer used according to the present invention.

The prior art polymer in the form of spherical beads was a commercially available crosslinked polystyrene, containing 2% of divinyl benzene and containing 1.5 milliequivalents of —$CH_2$—Cl per gram. The polymer used according to the present invention in the form of a fine powder was a graft copolymer, poly(tetrafluoroethylene-g-chloromethylstyrene) containing 1.9 milliequivalents of —$CH_2$.Cl per gram. Separate portions of each of the polymers were treated as follows. A weighed portion of the polymer, approximately 0.5 g., was transferred to a glass fibre cloth bag and the whole was immersed in chloroform for the period stated in Table IV. The bag and solvent-wet polymer were then removed from the chloroform, the excess chloroform was centrifuged off as rapidly as possible and the solvent-wet bag and solvent-wet polymer were weighed. A control experiment in the absence of the polymer was performed as above on a glass fibre bag to determine the amount of chloroform retained by the glass fibre bag. The increase in weight of the solvent-wet polymer due to the action of chloroform on the polymer was determined and expressed as a percentage increase over the weight of the original polymer. The results are set out in Table IV.

TABLE IV
Effect of chloroform on original polymer

| Immersion time (minutes): | Prior art polymer, percent increase in weight | Polymer according to this invention, percent increase in weight |
|---|---|---|
| 0 | 0 | 0 |
| 5 | 510 | 66 |
| 25 | 530 | 66 |

The chloroform-wet polymers obtained above in their glass fibre bags were immersed in methanol for the period stated in Table V. The bag and solvent-wet polymer were then removed from the methanol, the excess solvent was centrifuged off as rapidly as possible, and the solvent-wet bag and the solvent-wet polymer were weighed. A control experiment in the absence of the solvent-wet polymer was performed as above on a chloroform-wet glass fibre bag to determine the amount of solvent retained by the glass fibre bag. The charge in weight of the solvent-wet polymer due to the action of methanol on the chloroform-wet polymer was determined and expressed as a percentage increase over the weight of the original polymer. The results are set out in Table V.

TABLE V
Effect of methanol on chloroform-wet polymer expressed as a percentage increase in weight of the original polymer

| Immersion time (minutes): | Prior art polymer, percent increase in weight | Polymer according to this invention, percent increase in weight |
|---|---|---|
| 1 | 270 | 27 |
| 2 | 70 | 13 |
| 3 | 37 | 7 |
| 4 | 30 | 5 |
| 5 | 27 | 5 |
| 6 | 23 | 4 |
| 7 | 20 | 3 |
| 8 | 20 | 3 |

This example shows that a polymer of the present invention is swollen by chloroform to about one-eighth of the extent of a polymer of the prior art and that the relatively slight swelling of a polymer of the present invention can be overcome to a much greater extent than with the prior art polymer by treatment with methanol. We consider that the polymer backbone itself of the polymer according to this invention was not affected by the solvent, but only its surface graft and that this explains the far lower degree of swelling. Swelling controls the ease of penetration, retention of reactants and solute, rate of washing and filtration. It is considered that this advantage over polymer $P_2$ will be greater and more critical as the length of the peptide chain increases.

EXAMPLE 3

Synthesis of L-iso-leucyl-im-benzyl-L-histidyl-L-prolyl-L-phenylalanine.

A solution of t-boc-L-phenylalanine wherein t-boc stands for N-tertiary butyloxycarbonyl (400 mg. 1.501 mmole) and triethylamine (0.188 ml., 1.501 mmole) in the ethyl alcohol (1.5 ml.) was added to a suspension of poly(trifluorochloroethylene - g - chloromethyl styrene) ($P_F$) (9.741 g., 0.226 mmole —$CH_2$Cl/g.) in ethyl alcohol (5.0 ml.) contained in a 25 ml. round bottomed flask. The amino acid solution was washed into the flask with further ethyl alcohol (3× 1.5 ml.) to give a total volume of approximately 11.0 ml. The flask was fitted with a condenser and the mixture refluxed for 48 hours.

This procedure was repeated with poly(trifluorochloroethylene-g-chloromethyl styrene) ($P_F$) (13.602 g., 0.162 mmole —$CH_2$Cl/g.).

The polymers were each treated in an identical manner as follows: The polymers were filtered and washed consecutively with ethyl alcohol, water and methyl alcohol and dried in vacuo. The weight gain of the polymers ($P_E$=152 mg. $P_F$=170 mg.) indicated that coupling of amino acid to the polymer had occurred.

The following cycle of operations was carried out on each polymer complex to add further amino acids to the chain.

(1) Washed with 4× 20 ml. of dioxan,
(2) The t-boc group cleaved by stirring with 15 ml. of 4 M HCl in dioxan for 30 minutes,
(3) Washed with 4× 20 ml. of dioxan,
(4) Washed with 4× 20 ml. of chloroform,
(5) Neutralized by stirring with 15 ml. of 10% triethylamine in chloroform for 30 minutes,
(6) Washed with 4× 20 ml. of chloroform,
(7) Washed with 4× 20 ml. of methylene chloride,
(8) A soltuion of the appropriate t-boc-amino acid (1.972 mmole) in methylene chloride (5.0 ml.) added and allowed to stir for 15 minutes at room temperature,
(9) A solution of N,N-dicyclohexylcarbodiimide (1.972 mmole) in methylene chloride (5.0 ml.) added and allowed to stir for 16 hours at room temperature,
(10) Filtered, washed with 4× 20 ml. of methylene chloride,
(11) Washed with 4× 20 ml. of chloroform,
(12) Washed 4× 20 ml. of dimethylformamide (DMF),
(13) Washed with 4× 20 ml. of ethyl alcohol,
(14) Washed with 4× 20 ml. of dioxan and the cycle from step 2 to step 14 was repeated, with the modification hereinafter described, for each amino acid.

The following amino acids (in order) were added at step 8, t-boc-L-proline (424 mg., 1.972 mmole), t-boc-im-benzyl-L-histidine (681 mg., 1.972 mmole) and t-boc-L-isoleucine (456 mg., 1.972 mmole). For the im-benzyl-L-histidine cycle, step (7) was replaced by a DMF wash and DMF was substituted for methylene chloride in steps 8 to 10.

At the completion of the final reaction cycle the polymer complex was dried in vacuo and transferred to a stirrer reaction vessel containing a fritted-disc. The apparatus was protected from atmospheric moisture with anhydrous calcium sulphate drying tubes. The polymer was suspended in trifluoroacetic acid (10 ml.) and a slow stream of anhydrous hydrogen bromide passed through the fritted disc. The hydrogen bromide flow was stopped after 5 minutes and the trifluoroacetic acid solution filtered off and collected. A further 10 ml. of trifluoroacetic acid was added and stirring and gas flow continued for an additional 5 minutes. Fractions were thus collected at 5, 10, 15, 30, 60 and 90 minute intervals. This process of continued removal of the cleaved peptide from the reaction mixture was found to give a much cleaner product than if left for 90 minutes of continued gas flow.

The fractions were evaporated to dryness under reduced pressure at 25° C., redissolved in fresh trifluoroacetic acid, and re-evaporated. High voltage paper electrophoresis was carried out on the light brown oily residues which remained. Each fraction ran as a single spot with only traces of unreacted amino acids. The weight of the fractions indicated that approximately 80% of the peptide was cleaved from resins $P_E$ and $P_F$ after 30 minutes cleavage time.

The fractions for each polymer were dissolved in dilute acetic acid, combined and lyophilized to yield a white fluffy powder. Portion of the crude product (50 mg.) was dissolved in 0.01 M acetic acid (1.5 ml.) and applied to a "Biogel-$P_2$" gel-filtration column (40 cm. x 2 cm.) previously equilibrated in 0.01 M acetic acid. The eluate was monitored by UV absorption and 1.5 ml. fractions collected. One major peak was obtained with only minor amounts of lower molecular weight material appearing as a small shoulder. Ninhydrin analysis of the fractions gave an identical pattern. Fractions corresponding to the top of the major peak were combined and lyophilized to a white powder. The L-isoleucyl-im-benzyl-L-histidyl-L-propyl-L-phenylalanine so obtained ran as a single homogeneous spot on high voltage paper electrophoresis. The electrophoresis pattern of the hydrolyzate obtained after hydrolysis of a small portion of the purified product with 12 N HCl at 110° C. for 24 hours was identical with a standard mixture of the 4 amino acids used in the synthesis. The overall yield of peptide from each resin was $P_E=270$ mg., $P_F=293$ mg.

EXAMPLE 4

This example illustrates the synthesis of a biologically active peptide L-aspartyl-L-arginyl-L-valyl-L-tyrosyl-L-isoleucyl-L-histidyl-L-prolyl-L-phenylalanine (Isoleucine[5]-argiostensin II).

Example 3 was repeated using polymer $P_F$ with the cycle of operation 1 to 14 repeated a further 4 times to allow the incorporation of the following addition amino acids (in order) to the peptide chain: t-boc-O-benzyl-L-tyrosine (550 mg.), t-boc-L-valine (322 mg.), t-boc-nitro-L-arginine (630 mg.) and t-boc-L-aspartic acid β-benzyl ester (480 mg.). For the t-boc-nitro-L-arginine cycle, step 7 was replaced by a dimethylformamide (DMF) wash and DMF was substituted for methylene chloride in steps 8 to 10.

At the completion of the final reaction cycle the peptide was cleaved from the solid phase with hydrogen bromide in trifluoroacetic acid according to the conditions described in Example 3. The cleavage fractions were evaporated to dryness under reduced pressure at 25° C., redissolved in fresh trifluoroacetic acid, re-evaporated and dried in vacuo over $P_2O_5$. The peptide fractions so obtained (1.363 g.) were combined and suspended in a water:methanol mixture 1:4 (20 ml.). Insoluble material was removed by centrifugation and portions of the supernatant liquid (1.5 ml.) were applied to a "Sephadex LH-20" gel-filtration column (60 cm. x 1.5 cm.) previously equilibrated in water:methanol (1:4). The eluate was monitored by UV absorption and 1.5 ml. fractions collected. One major peak appeared off the column with 2 smaller peaks appearing on the low molecular weight (descending) shoulder. Fractions corresponding to the ascending side and top of the major peak from several runs were combined and evaporated to dryness on a rotary evaporator. The white peptide residue was dissolved in dilute acid and lyophilized.

A portion of the lyophilized product (50 mg.) was dissolved in a mixture of methanol, acetic acid and water (10:1:1) (20 ml.); 5% palladium oxide on barium sulphate (100 ml.) was added and hydrogen gas bubbled through the stirred mixture at room temperature for 3 days.

After removal of the catalyst by centrifugation the solution was evaporated to dryness and the residue dissolved in 0.1 M acetic acid (1.5 ml.) and applied to a "Biogel $P_2$" gel-filtration column (40 cm. x 2 cm.) previously equilibrated in 0.1 M acetic acid. 2.0 ml. fractions were collected. The eluate contained one major peak as determined by UV absorption. The contents of the peak tubes were combined and lyophilized to yield a white fluffy powder which gave a single homogeneous spot on high voltage paper electrophoresis. Hydrolysis of a portion of the peptide (2 mg.) in 12 N HCl at 110° C. for 48 hours gave an electrophoretic pattern identical to that of a standard mixture of the eight amino acids used in the synthesis. Dansyl end-group analysis indicated aspartic acid is the N-terminal amino acid.

A portion of the purified deprotected peptide (L-aspartyl-L-arginyl-L-valyl-L-tyrosyl-L-isoleucyl-L-histidyl-L-prolyl-L-phenylalanine) was dissolved in pH 7.4 phosphate buffered saline (10 mμg./0.1 ml.) and found to be biologically active as determined by pressor assay in vagotomized, ganglion-blocked rats. Immunoreactivity of the peptide was also demonstrated by comparison with asparagine[1]-valine[5]-angiotensin II ("Hypertensin," CIBA) for binding to specific angiotensin II antibodies by the method of radioimmunoassay.

EXAMPLE 5

This example illustrates the synthesis of a biologically active peptide L - aspartyl-L-arginyl-L-valyl-L-tyrosyl-L-isoleucyl - L - histidyl-L-prolyl-L-phenylalanyl-L-histidyl-L-leucine (Isoleucine[5]-angiotensin I), using the graft copolymer solid-phase in the form of a shaped article.

A solution of t-boc-L-leucine (376 mg., 1.50 mmole) and triethylamine (0.188 ml., 1.501 mmole) in ethyl alcohol (1.5 ml.) was added to poly(tetrafluoroethylene-g-chloromethyl styrene) in the form of thin discs approximately 1.5" in diameter and 0.01" thickness (6.523 g., 0.337 mmole—$CH_2Cl/g$.) suspended in ethyl alcohol (5.0 ml.) and contained in a 25 ml. round-bottomed flask. The amino acid solution was washed into the flask with further ethyl alcohol (3 × 1.5 ml.) to give a total volume of approximately 11.0 ml. The flask was fitted with a condenser and the mixture refluxed for 48 hours.

The supernatant liquor was then aspirated from the discs followed by several washings with ethyl alcohol, water and methyl alcohol. The discs were then dried in vacuo over $P_2O_5$. The weight gain of the discs (132 mg.) indicated that coupling of the amino acid to the polymer had occurred.

The handling and transfer operations involved in washing and drying the polymeric solid-phase were greatly facilitated by virtue of the physical form of the polymer. Filtration procedures were greatly simplified and loss of solid-phase due to handling was entirely eliminated.

The cycle of operations 1 to 14 detailed in Example 3 was then carried out to add further amino acids to the chain. The amino acids added at step 8 were (in order of addition): t - boc-im-benzyl-L-histidine (674 mg., 1.95 mmole), t-boc-L-phenylalanine (388 mg., 1.47 mmole), t-boc-L-proline (315 mg., 1.47 mmole), t-boc-im-benzyl-L - histidine (674 mg., 1.95 mmole), t-boc-L-isoleucine (339 mg., 1.47 mmole), t-boc-O-benzyl-L-tyrosine (545 mg., 1.47 mmole), t-boc-L-valine (318 mg., 1.47 mmole), t-boc-nitro-L-arginine (624 mg., 1.95 mmole) and t-boc-L-aspartic acid β benzyl ester (474 mg., 1.47 mmole). For the im-benzyl-L-histidine and nitro-L-arginine cycles step 7 was replaced by a DMF wash and DMF was substituted for methylene chloride in steps 8 to 10.

At the completion of the final reaction cycle, the protected peptide was cleaved from the discs, purified, the protecting groups removed by hydrogenation and the product finally purified by gel filtration according to the procedure described in Example 4 for isoleucine[5]-angiotensin II.

The finally purified peptide, L - aspartyl-L-arginyl-L-valyl-L - tyrosyl-L-isoleucyl-L-histidyl-L-prolyl-L-phenylalanyl-L-histidyl-L-leucine (98 mg.) gave a single spot on high voltage paper electrophoresis. Dansyl end-group analysis indicated aspartic acid as the N-terminal amino acid and hydrolysis of a portion of the peptide (2 mg.) in 12 N HCl at 110° for 48 hours gave an electrophoretic pattern identical to that of a standard mixture of the nine different amino acids used in the synthesis.

Biologically and immuno-reactivity of the peptide was determined by the methods described in Example 4 and found to be comparable to that exhibited by an authentic sample of asparagine[1]-valine[5]-angiotensin I (CIBA).

EXAMPLE 6

This sample demonstrates the marked advantage of the polymers of this invention over the prior art polymers in the production of peptides on a pharmaceutical preparative scale.

Using the solid-phase in the form of cylindrical pellets approximately 10 mm. long and 5 mm. diameter the numerous washing and filtration steps are greatly simplified. Thus filtration in a system using pellets according to this invention can be effected simply in a large reaction vessel by incorporation of a coarse mesh over the outlet tap. Prior art systems, by contrast, in which the solid phase forms a swollen sticky gel during the washing and reaction cycles, occlude impurities and wash liquor and consequently require more elaborate filtration, e.g. on a sintered glass filter; this, in view of the gelatinous nature of the solid phase, is extremely slow, if not entirely impractical on technical scale.

The synthesis of a simple tripeptide L-valyl-L-prolyl-L-phenylalanine was used to compare poly(tetrafluoroethylene-g-chloromethyl styrene), Polymer $P_G$, in the form of pellets (10 mm. x 5 mm.) with the prior art polymer chloromethylated polystyrene cross-linked with 2% divinyl benzene, Polymer $P_H$, for ease and efficiency of large scale handling. Two 5 litre spherical glass reaction vessels were constructed both fitted with a paddle stirrer, two inlet sockets and an outlet tap at the base of the vessel. The reactors were surrounded with heating mantles for the necessary heating cycle. One inlet socket was connected to a master switching valve which enabled appropriate solvents or reagents to be admitted to the reactor automatically in desired sequence. One reactor ($R_A$) for use with the prior art polymer was fitted with a 4″ sintered glass disc above the outlet tap. On the other reactor ($R_B$) this sintered disc was replaced by a coarse mesh immediately above the outlet. Wash liquors and excess reagents were removed by opening the outlet tap, applying a small negative pressure and transferring them to vessels from which the solvents were recovered by distillation.

Into each reactor (with outlet tap closed) was placed t-boc-L-phenylalanine (70 g., 0.263 mole) followed by ethyl alcohol (2 l.) and the mixture stirred until the amino acid dissolved. To each vessel was then added triethylamine (33 ml., 0.263 mole) and stirring continued for a further 1 hour. Chloromethylated polystyrene cross-linked with 2% divinyl benzene (262 g., 0.385 mole —$CH_2Cl$), Polymer $P_H$, was then added to reactor $R_A$ and poly(tetrafluoroethylene-g-chloromethyl styrene) pellets (1137 g., 0.385 mole —$CH_2Cl$), Polymer $P_G$, to reactor $R_B$. A condenser was placed into one of the inlet sockets and the mixture stirred vigorously and heated to reflux for 72 hours. The outlet tap was then opened and excess amino acid solution removed by filtration. The polymers were then washed successively with ethyl alcohol (2× 2.5 l.), water (2× 2.5 l.) and methyl alcohol (2× 2.5 l.).

The following cycle of operations was carried out to add further amino acids to the polymer complex:

(1) Washed with 3× 2 l. of dioxan;
(2) The t-boc group cleaved by stirring with 2 l. of 4 M HCl in dioxan for 1 hour;
(3) Washed with 3× 2 l. of dioxan;
(4) Washed with 3× 2 l. of chloroform;
(5) Neutralized by stirring with 2 l. of 10% methylamine in chloroform for 2 hours;
(6) Washed with 3× 2 l. of chloroform;
(7) Washed with 3× 2 l. of methylene chloride;
(8′) A solution of the appropriate t-boc amino acid (0.255 mole) in methylene chloride (1 l.) added and allowed to stir for 1 hour at room temperature;
(9) A solution of N,N - dicyclohexylcarbodiimide (0.255 mole) in methylene chloride (1 l.) added and allowed to stir for 24 hours at room temperature;
(10) Filtered, washed with 3× (or 5) 2 l. of methylene chloride;
(11) Washed with 3× 2 l. of chloroform;
(12) Washed with 3× 2 l. of dimethylformamide (DMF);
(13) Washed with 3× 2 l. of ethyl alcohol;
(14) Washed with 3× 2 l. of dioxan and the cycle from step 2 to 14 repeated once.

t-boc-L-proline was the amino acid used in the first addition cycle and t-boc-valine used in the second cycle.

In reactor $R_A$ the swelling solvents dioxan, chloroform, methylene chloride and DMF caused the polymer ($P_H$) to swell considerably to about three times its original volume. The resultant gel was found to ride up and stick tenaciously to the walls of the vessel. The pellets ($P_G$), swollen only slightly by the solvent, remained as a free-flowing system with no apparent stickiness.

The washing cycle, step 10, was monitored by ninhydrin analysis for efficiency in removal of unreacted amino acid. For polymer $P_G$ the filtrate was free from amino acid contamination after the third wash. For polymer $P_H$ at least 5 washings were required to completely free the polymer of excess amino acid.

After completion of the final reaction cycle the polymers were suspended in a solution of trifluoroacetic acid in methylene chloride (1:1, 2 l.), stirred vigorously and hydrogen bromide gas bubbled through the mixture for 2 hours at room temperature. The mixtures were then filtered and the filtrates reduced in volume to dryness. The resultant oils were lyophilized from dilute acetic acid to yield crude L-valyl-L-prolyl-L-phenylalanine. The crude yield from $P_G$ was 18 gm. and from $P_H$ 13.5 gm. The overall time of the reaction was considerably less when using polymer $P_G$ than when using polymer $P_H$. This reduction in time was effected mainly by the reduction in time required to wash and filter the reaction mass.

We claim:

1. A process for the preparation of peptides or proteins which comprises:

(1) reacting a first protected amino acid with a copolymer which is characterized in that it is a graft copolymer of a chemically inert polymeric backbone having surface grafted side chains comprising a multiplicity of mer units of the formula

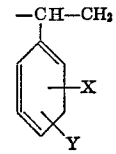

wherein X is at least one amino acid reactive group forming a bond with the first amino acid which is not cleaved during subsequent reaction of said first amino acid with a second amino acid and wherein Y stands for one or more optional substituents which is non-reactive to amino acids, to form a stable linkage between the protected amino acid and the copolymer;

(2) deprotecting the amino acid copolymer-complex formed by removing the protecting group;

(3) coupling at least one further protected amino acid with the deprotected reactive group of the first amino acid copolymer-complex obtained in (2);

(4) optionally, alternately repeating one or more times the removal step (2) of the protecting group from the last amino acid attached to the polymer-complex and the coupling step (3) with yet a further amino acid; and (5) optionally cleaving the desired peptide from the resulting peptide-copolymer by rupture of one selected bond in the chain.

2. In a process for the preparation of peptides or proteins which comprises:

(1) reacting a first protected amino acid with a solid phase surface graft-copolymer to form a bond with said surface graft copolymer sufficiently strong not to be cleaved during subsequent deprotecting reaction and subsequent coupling reaction of said first amino acid with a second amino acid;

(2) deprotecting the amino acid-copolymer formed by removing the protecting group;

(3) coupling at least one further protected amino acid with the deprotected reactive group of the first amino acid-polymer obtained in (2);

(4) alternately repeating one or more times the removal step (2) of the protecting group from the last amino acid attached to resulting peptide chain-copolymer and the coupling step (3) with yet a further amino acid; and (5) optionally cleaving the desired peptide from the resulting copolymer by rupture of one selected bond in the chain, the improvement which comprises using, as the copolymer, a solid graft copolymer comprising an inert polymeric backbone and a protein-reactive surface composed of polymeric side chains grafted onto said polymeric backbone and comprising a multiplicity of mer units of the formula

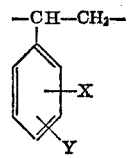

wherein X is a protein-reactive group selected from the group consisting of isothiocyanato; the group —LNHR″, L being an alkylene linking group preserving the basicity of the amino group, and R″ being H or lower alkyl and said group —LNHR″ being capable of coupling with the carboxylic acid group of an amino acid by means of the carbodiimide linking reaction; chloromethyl;

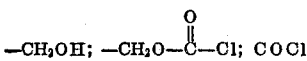

carboxy and a diazonium salt

wherein Z is the residue of a strong acid and wherein Y stands for one or more optional substituents which are non-reactive with proteins, the graft being essentially only on the surface of the polymeric backbone with the virtual absence of reactive groups inside said backbone and the amino acid being chemically bonded only to said surface graft through said substituent.

3. A process according to claim 2 wherein the inert polymeric backbone is selected from the group consisting of poly(halofluoroalkylenes) and polyolefins.

4. A process according to claim 2 wherein the inert polymeric backbone is poly(tetrafluoroethylene) or poly-(trifluoromonochloroethylene).

5. A process according to claim 2 wherein the mer unit is styrene.

6. A process according to claim 2 wherein X is

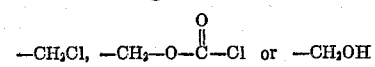

7. A process according to claim 2 wherein the graft copolymer is poly(tetrafluoroethylene-g-chloromethyl styrene).

8. In a process according to claim 2 wherein steps (1) to (5) comprise:

(1) reacting solid phase poly(trifluoromonochloroethylene-g-chloromethyl-styrene) with the trialkylammonium salt of a first amino acid or peptide, the amino group of which is protected by an acid sensitive amino-protecting group to form an ester of said amino acid or peptide with the chloromethylated graft copolymer;

(2) cleaving said protecting group from the copolymer-amino acid ester complex by treating it with a hydrogen halide and forming the amine base from the resultant salt;

(3) coupling to the amino acid ester-copolymer complex resulting from (2) at least one further amino acid or peptide having an acid sensitive amino-protecting group by means of a carbodiimide coupling group;

(4) repeating the deprotecting step (2) and the coupling step (3) alternatingly with a number of selected amino acids or peptides; and (5) cleaving the peptide from the copolymer carrier.

9. A process according to claim 2 wherein the graft copolymer is a disc, pellet, or porous mass.

10. A process according to claim 2 characterized in that the process is automated.

11. A process according to claim 2 wherein the rupture step (5) is omitted and the peptide copolymer is the desired product.

References Cited

UNITED STATES PATENTS 3,390,144  6/1968  Kessler et al. _____ 260—112.5

OTHER REFERENCES

Tilak et al.: Tet. Lett., 1968, 1297 (February).
Merrifield et al.: Anal. Chem., 38, 1905 (1966).
Letsinger et al.: (I), J.A.C.S., 85, 3045 (1963).
Letsinger et al.: (II), J.A.C.S., 86, 5163 (1964).
Catt et al.: Biochem. J., 100, 31c (1966).

LEWIS GOTTS, Primary Examiner

R. J. SUYAT, Assistant Examiner

U.S. Cl. X.R.

260—78 A